United States Patent
Kiely et al.

(10) Patent No.: US 7,582,831 B2
(45) Date of Patent: *Sep. 1, 2009

(54) ELECTRICAL CONNECTOR

(75) Inventors: Kenneth M. Kiely, Milford, CT (US); Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/214,955

(22) Filed: Jun. 24, 2008

(65) Prior Publication Data
US 2008/0302568 A1   Dec. 11, 2008

Related U.S. Application Data

(63) Continuation-in-part of application No. 11/713,264, filed on Mar. 2, 2007, now Pat. No. 7,402,752.

(51) Int. Cl.
*H01R 4/00* (2006.01)

(52) U.S. Cl. .................. 174/84 R; 174/88 R (58) Field of Classification Search ............ 174/65 G, 174/68.1, 68.3, 72 C, 69, 71 R; 439/92, 587, 439/320, 557, 535, 567, 142
See application file for complete search history.

(56) References Cited

U.S. PATENT DOCUMENTS

| | | | |
|---|---|---|---|
| 6,355,884 B1 * | 3/2002 | Gretz | 174/659 |
| 7,075,007 B2 * | 7/2006 | Auray et al. | 174/668 |

* cited by examiner

*Primary Examiner*—William H Mayo, III
(74) *Attorney, Agent, or Firm*—Melvin I. Stoltz (57) ABSTRACT

By enabling two separate and independent flexible metal conduit and/or armored or metal clad cables to be secured to a single connector for being mounted directly to a single elongated rigid or solid electrical tubing/conduit, an easily manufactured and assembled connector is realized. A dual or duplex conduit/cable connector is constructed for receiving two separate and independent flexible metal conduits and/or armored or metal clad cables and enabling the two conduit/cables to be securely affixed to one end of the connector. The connector preferably incorporates a clamping bracket associated therewith to assure rapid and efficient assembly of the two flexible metal conduits and/or armored or metal clad cables to the duplex connector.

16 Claims, 7 Drawing Sheets

FIG. 10

ELECTRICAL CONNECTOR

RELATED DATA

This application is a continuation-in-part of U.S. patent application Ser. No. 11/713,264, filed Mar. 2, 2007 entitled ELETRICAL CONNECTOR, which is now U.S. Pat. No. 7,402,752, issued on Jul. 22, 2008.

TECHNICAL FIELD

This invention relates to electrical connectors, and more particularly, to electrical connectors constructed for securing flexible metal conduits and/or metal clad sheath cables to solid tubing conduits.

BACKGROUND ART

In the field of wiring homes and buildings, whether for new construction or for improvements or expansion, substantial development and product improvements have been made. Typically, these improvements are directed to enabling installers to securely mount any desired wiring to any desired location in the most efficient and quickest manner.

In any particular installation or location, various conduits or cables must be interconnected to each other as well as connected to the primary power supply in a suitable power distributing outlet box, junction box, or other enclosure. In each of these instances, flexible metal conduits and/or armored or metal clad cables, within which the electrical power carrying wires are contained, must be securely mounted to the housing of a junction box or outlet box, or connected to an appropriate solid or rigid metal tubing or conduit.

In order to enable installers to securely mount flexible metal conduits and/or armored or metal clad cables to any desired junction box or outlet box, numerous prior art connectors have been developed. However, in spite of the substantial effort that has been expended in developing such connectors, no prior art system has been developed which enables two flexible metal conduits and/or armored or metal clad cables to be mounted together in combination with a single elongated, solid or rigid tubing/conduit.

In general, the industry manufacturers and suppliers provide numerous constructions for enabling a single flexible metal conduit and/or metal clad or armored cable to be securely mounted to either a junction box or outlet box or to an elongated, solid or rigid tubing or conduit. However, during the installation of electrical wires, various instances occur wherein an installer wishes to interconnect two flexible metal conduits and/or armored or metal clad cables to a single elongated, solid or rigid tubing/conduit. However, no prior art connector of this nature exists and installers are required to employ connectors that are not designed for this configuration.

Therefore, it is a principal object of the present invention to provide a connector which enables the secure, rapid, mounted interengagement and retention of two separate and independent flexible metal conduits and/or armored or metal clad cables with a single elongated, solid or rigid tubing/conduit.

Another object of the present invention is to provide a connector having the characteristic features described above which is capable of being employed quickly and easily, for securely mounting two separate and independent flexible metal conduits and/or armored or metal clad cables directly to a single solid or rigid tubing/conduit without difficulty.

Another object of the present invention is to provide a connector having the characteristic features described above which enables the entire assembly of the two separate and independent flexible metal conduits and/or armored or metal clad cables to be achieved quickly and easily by a single individual.

Other a more specific objects will in part be obvious and will in part appear hereinafter.

SUMMARY OF THE INVENTION

By employing the present invention, all of the difficulties and drawbacks of the prior art systems have been overcome and an efficient, easily manufactured and easily assembled connector is realized. Furthermore, using the connector of the present invention, two separate and independent flexible metal conduit and/or armored or metal clad cables are quickly and easily secured to the connector for being mounted directly to a single elongated rigid or solid electrical tubing/conduit. By employing the present invention, complete assurance is provided that the entire mounting operation can be achieved by a single operator both quickly and easily.

In its preferred construction, the dual or duplex conduit/cable connector of the present invention is constructed for receiving two separate and independent flexible metal conduits and/or armored or metal clad cables and enabling the two conduit/cables to be securely-affixed to one end of the connector. In order to assure rapid, easy, and efficient assembly of the two flexible metal conduits and/or armored or metal clad cables to the duplex connector of the present invention, the connector preferably incorporates a clamping bracket associated therewith.

Although the clamping bracket may be formed in a wide variety of alternate configurations, in the preferred embodiment, two separate U-shaped brackets are mounted at one end of the duplex connector with one side of each bracket being mounted in a receiving slot formed in the connector. The second end of each bracket overlies the receiving aperture of the connector and is positioned for directly contacting the outside surface of the flexible metal conduit and/or armored or metal clad cable mounted thereto. In addition, the central portion of the U-shaped bracket incorporates a threaded aperture which is cooperatively associated with a locking screw threadily engaged with the connector.

By employing this preferred construction, two separate and independent flexible metal conduits and/or armored or metal clad cables are inserted into the receiving aperture formed at one end of the duplex connector and are securely mounted in the desired position. In order to assure secure mounted engagement of each conduit/cable in the connector, each of the two U-shaped clamping brackets are employed.

In this regard, each clamping bracket is released for enabling the two flexible metal conduits and/or armored metal clad cables to be fully inserted into the duplex connector. Once fully inserted therein, the clamping brackets are secured by rotating the locking screws, causing the two sides of the bracket to be drawn downwardly into abutting contact with the outer surface of the flexible metal conduit and/or armored or metal clad cables. In this regard, one side of the bracket securely engages the conduits/cable at the opening of the connector, while the other side of the bracket, which passes through the slot formed in the connector, engages the outer surface of the conduit/cable directly within the connector. In this way, assurance is provided that both flexible metal conduits and/or armored or metal clad cables are securely affixed to the duplex connector.

In an alternate preferred embodiment of the present invention, the dual or duplex conduit/cable connector of the present invention is constructed with two locking rings or sleeves mounted in one end of the connector in adjacent relationship with each locking ring/sleeve being constructed for enabling a separate and independent flexible metal conduit and/or armor or metal clad cable to be inserted and lockingly engaged therein. In this way, two separate and independent flexible metal conduits and/or armor or metal clad cables are quickly and easily securely affixed to one end of the connector.

In a preferred construction, each of the locking rings/sleeves is mounted in secure, locked engagement in one end of the connector of the present invention, with each locking ring/sleeve incorporating a plurality of flexible arms or fingers extending therefrom in position for lockingly engaging the outer surface of the metal conduit and/or armor or metal clad cable inserted therein. In this way, any desired pair of metal conduits and/or armor or metal clad cables are quickly and easily mounted to the same end of the connector of the present invention and securely affixed thereto.

Once the two flexible metal conduits and/or armored or metal clad cables are securely affixed in the desired position in the duplex connector of the present invention, the opposed end of the connector is securely affixed to any desired rigid conduit or solid tubing conduit, such as an electrical metal tubing (EMT). This secure affixation is quickly and easily achieved by telescopically advancing the receiving end of the duplex connector of the present invention onto the desired solid or rigid tubing/conduit and then securely affixing the connector directly to the tubing/conduit. This secure affixation is most easily achieved by employing a locking screw incorporated in the mounting end of the connector. Once completed, the duplex connector of the present invention is securely mounted in the precisely desired position with all of the component quickly and easily affixed thereto.

The invention accordingly comprises an article of manufacture possessing the features, properties, and the relation of elements which will be exemplified in the article hereinafter described, and the scope of the invention will be indicated in the claims.

THE DRAWINGS

For a fuller understanding of the nature and objects of the invention, reference should be had to the following detailed description taken in connection with the accompanying drawings, in which.

DETAILED DISCLOSURE

By referring to FIGS. 1-18, along with the following detailed discussion, the construction and operation of the duplex conduit/cable connector of the present invention can best be understood. Although the following disclosure and associated drawings fully and completely depict the preferred embodiments of the present invention, further alternate constructions can be made without departing from the scope of this invention. As a result, it is to be understood that all such alternate constructions and variations are intended to be within the scope of the present invention and encompassed therein.

Figure 1:
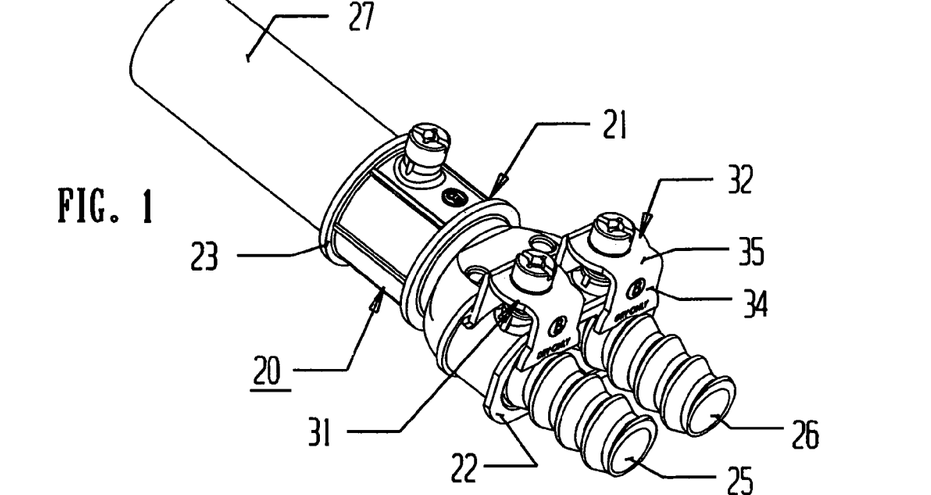
FIG. 1 is a front perspective view of the duplex connector of the present invention shown mounted to a solid or rigid tubing/conduit at one end thereof with two separate and independent flexible metal conduits and/or armored clad cables securely affixed to the opposed end thereof.
Figure 2:
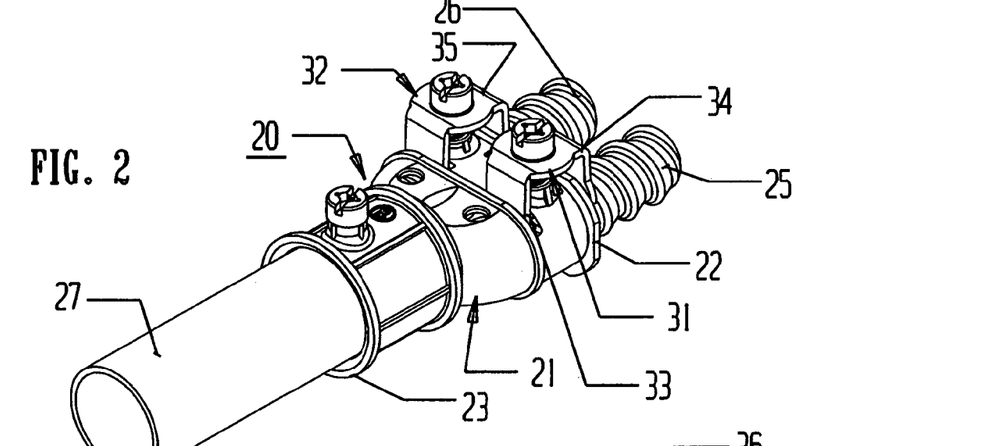
FIG. 2 is a front perspective view of the duplex connector of FIG. 1.
Figure 3:
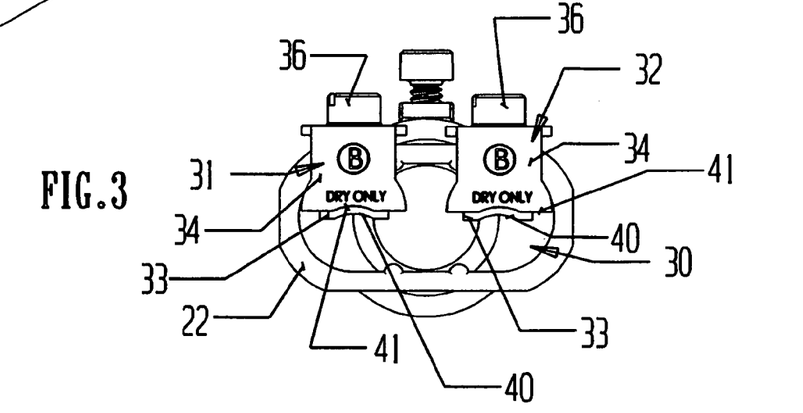
FIG. 3 is a front elevation view of the duplex connector of FIG. 2, with the two flexible metal conduits and/or armored clad cables removed therefrom.
Figure 4:
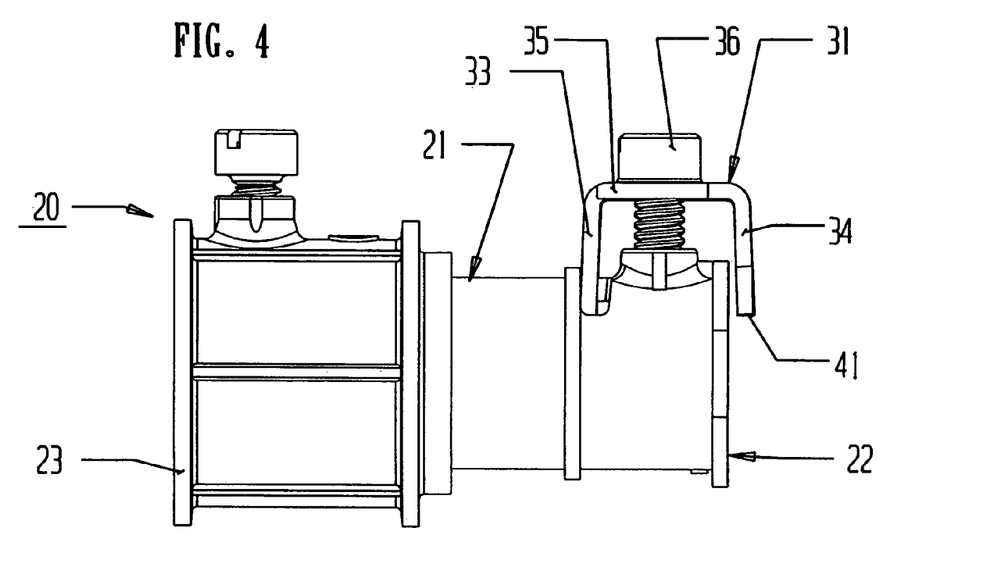
FIG. 4 is a side elevation view of the duplex connector of FIG. 3.
Figure 5:
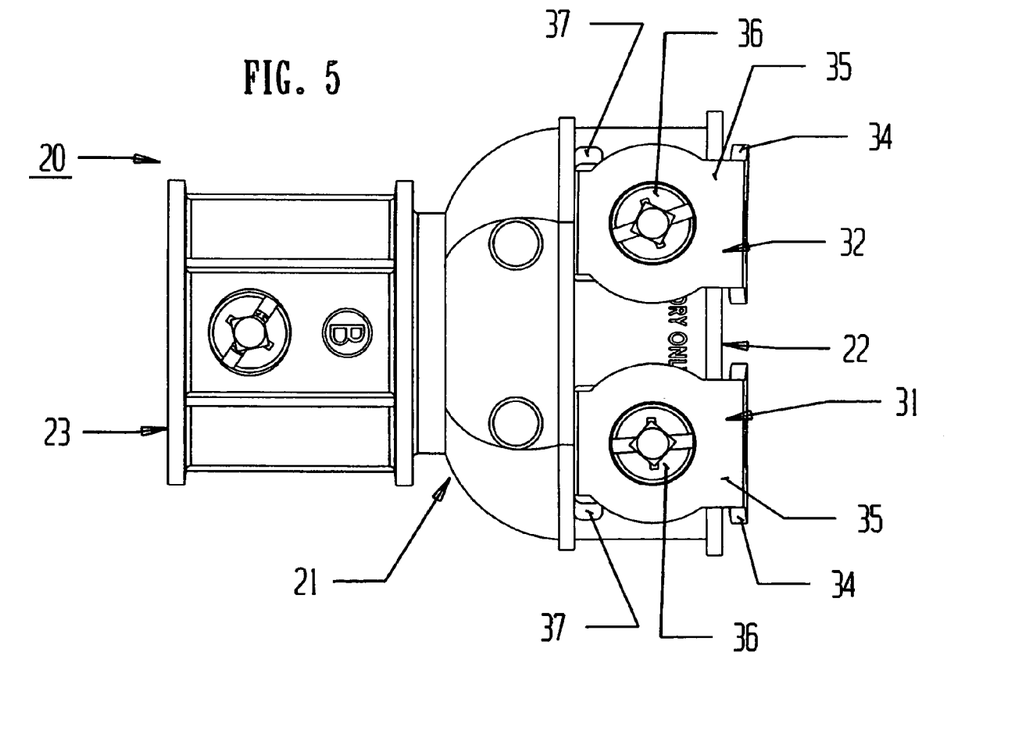
FIG. 5 is a top plan view of the duplex connector of FIG. 3.
Figure 6:
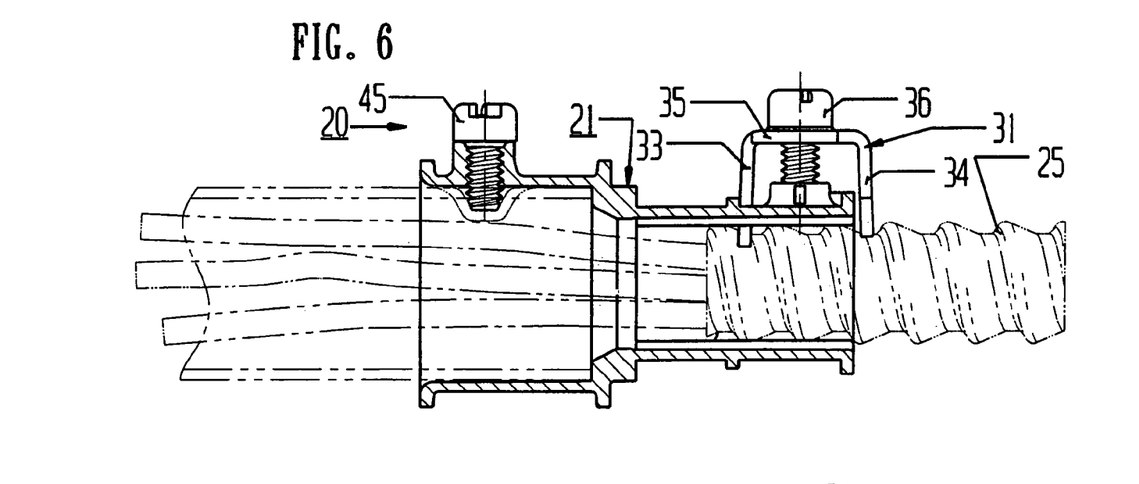
FIG. 6 is a cross-sectional side elevation view of the duplex connector of FIG. 2 with the solid or rigid tubing/conduit shown in phantom.
Figure 7:
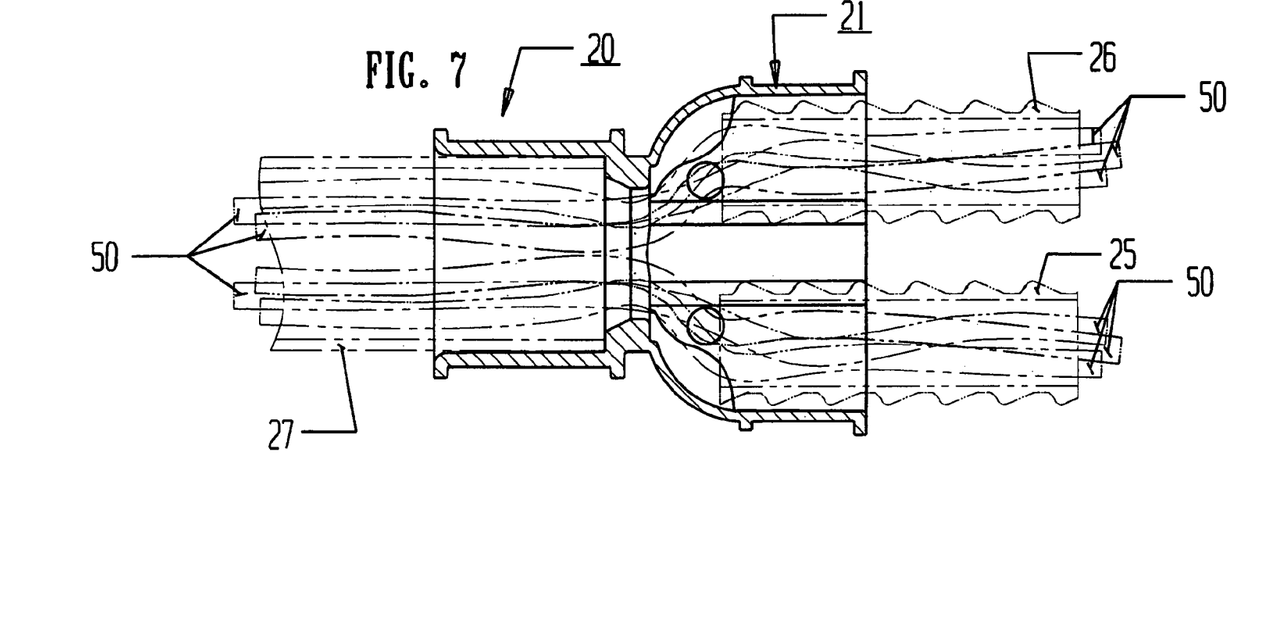
FIG. 7 is a cross-sectional top plan view of the duplex connector of FIG. 6.
Figures 8, 9:
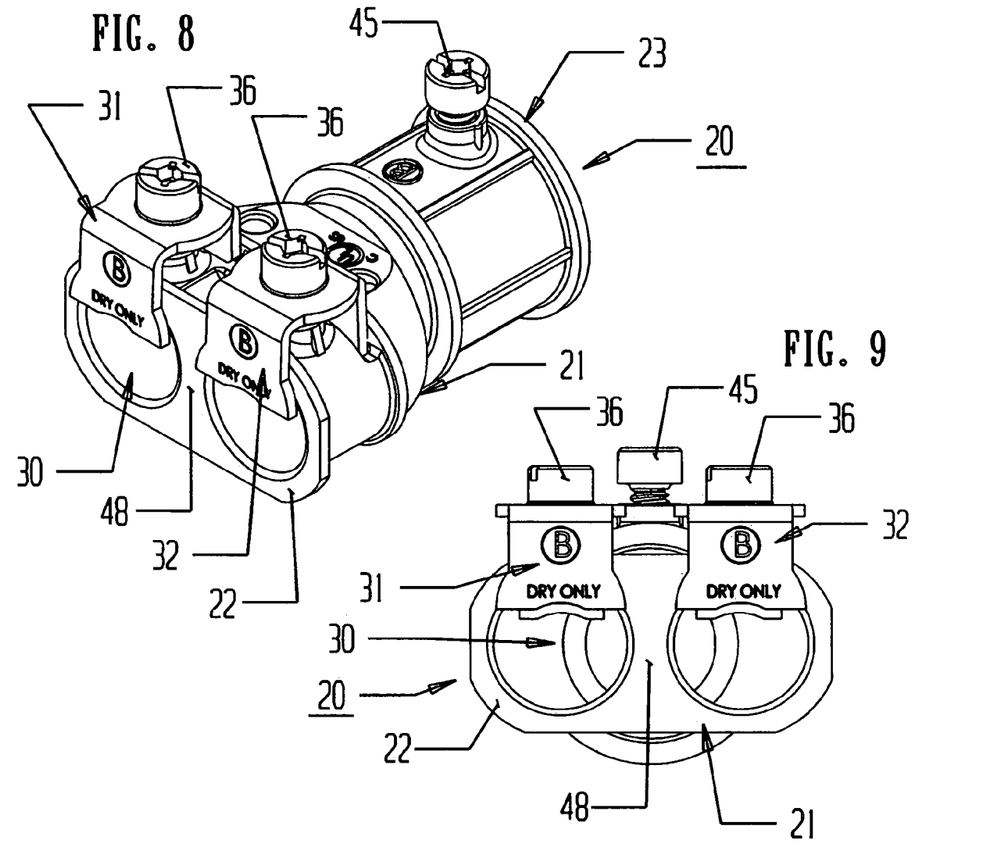
FIG. 8 is a front perspective view of a modified embodiment of the duplex connector of FIG. 1.
FIG. 9 is a front elevation view of the duplex connector of FIG. 8.
Figure 10:
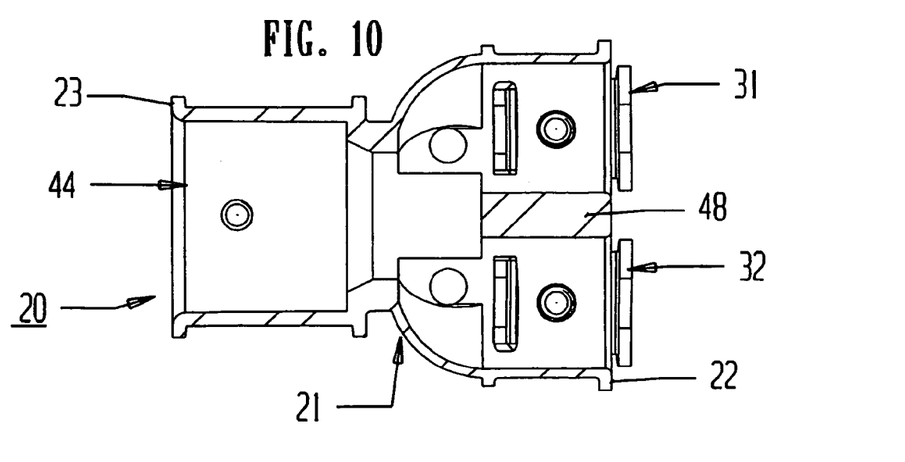
FIG. 10 is a cross-sectional bottom plan view of the duplex connector of FIG. 9.

In FIGS. 1 and 2, dual or duplex conduit/cable connector 20 is depicted incorporating body member 21, front end 22, and rear end 23. In addition, dual/duplex conduit/cable connector 20 is shown with flexible metal conduits and/or armored or metal clad cables 25 and 26 securely mounted to front end 22, while solid or rigid metal tubing or conduit 27 is shown securely affixed to rear end 23 of connector 20. As result, FIGS. 1 and 2 depict duplex conduit/cable connector 20 of the present invention in its fully assembled configuration.

As is evident from a review of FIGS. 1 and 2, duplex conduit/cable connector 20 of the present invention enables two separate and independent flexible metal conduits and/or armored or metal clad cables 25 and 26 to be quickly and easily securely affixed to connector 20 for enabling the electrical conducting wires retained within cables 25 and 26, as shown and fully detailed below, to be easily carried through solid or rigid tube/conduit 27. In this way, solid tubing conduit, such as electrical metal tubing (EMT) or rigid conduits can be quickly and easily interconnected with two separate and independent flexible metal conduits or cables, thereby providing installation ease and efficiency.

By referring to FIGS. 1-7, along with the following detailed description, the construction and operation of dual or duplex conduit/cable connector 20 of the present invention can best be understood. As depicted, dual/duplex conduit/cable connector 20 incorporates an enlarged front end 22 formed in body member 21 with front end 22 incorporating portal 30 which is constructed for receiving flexible metal conduits and/or armored or metal clad cables 25 and 26 therein. In order to assure that flexible metal conduit and/or armored or metal clad cables 25 and 26 are securely retained in the precisely desired position, connector 20 incorporates brackets 31 and 32.

In the preferred construction, brackets 31 and 32 each comprise a generally U-shape, formed by wall portions 33 and 34, and interconnecting portion 35. In addition, each of brackets 31 and 32 is cooperatively associated with screw 36 which securely affixes brackets 31 and 32 to body member 21. In this regard, body member 21 incorporates two slots 37 formed therein, each of which is constructed for receiving wall portion 33 of either bracket 31 or 32. In addition, screw 36 is readily engaged with brackets 31 and 32, as well as with body member 21, in order to securely maintain and position brackets 31 and 32 in the precisely desired location.

As depicted, by employing this construction, brackets 31 and 32 are cooperatively associated with front end 22 of body member 21, with wall portion 34 of each bracket 31 and 32 positioned in juxtaposed, spaced, cooperating relationship with portal 30 of front end 22. In addition, wall portion 33 of each bracket 31 and 32 extends through slot 37 of body member 21 for enabling the lower edge thereof to be positioned within the interior of body member 21.

In this way, as best seen in FIGS. 1 and 2, flexible metal conduits and/or armored or metal clad cables 25 and 26 are able to be quickly and easily inserted into portal 30 of front end 22 of body member 21, with brackets 31 and 32 positioned to allow flexible metal conduits and/or armored or metal clad cables 25 and 26 to be easily inserted into connector 20. Once flexible metal conduit and/or armored or metal clad cables 25 and 26 are axially advanced into portal 30 of body member 21 and placed in the desired position within body member 21 of connector 20, screws 36 are rotated for causing brackets 31 and 32 to be advanced into clamping engagement with the outer surface of flexible metal conduit and/or armored or metal clad cables 25 and 26.

In this regard, in the preferred construction, wall portion 33 of brackets 31 and 32 is constructed with arcuately curved zone 40 formed in the terminating edge thereof, while wall portion 34 of brackets 31 and 32 incorporates arcuately curved zone 41 formed in its terminating edge. In the preferred construction, arcuately curved zones 40 and 41 are constructed with a radius of curvature consistent with the radius of curvature found on the outer surface of flexible metal conduits and/or armored or metal clad cables 25 and 26. As a result, once flexible metal conduit and/or armored or metal clad cables 25 and 26 are inserted into front end 22 of body member 21, the advance of brackets 31 and 32 into clamping engagement with the outer surface of cables 25 and 26 enables arcuately curved zones 40 and 41 to securely contact and engage the outer surface of cables 25 and 26, assuring that cables 25 and 26 are securely affixed and retained in body member 21 of dual/duplex conduit/cable connector 20, preventing unwanted axial removal of cables 25 and 26 from connector 20.

In completing the installation of dual/duplex conduit/cable connector 20 in a typical application, connector 20 is securely mounted to a desired solid or rigid tube/conduit 27. In achieving this result, portal 44 is formed in rear end 23 of connector 20, with portal 44 being constructed for enabling solid or rigid tube/conduit 27 to be telescopically inserted through portal 44 into engagement with connector 20. Once inserted in position, locking screw 45 mounted to connector 20 directly adjacent portal 44 is a threadedly advanced into contact with solid or rigid tube/conduit 27, for securely affixing connector 20 to solid or rigid tube/conduit 27, thereby completing the installation and affixation of connector 20 in an easily achieved manner.

As is well known in the art, flexible metal conduit and/or armored or metal clad cables 25 and 26 are employed for carrying electrical wires 50 and enabling wires 50 to be distributed to the various locations for achieving the desired electrical connections. In this regard, whenever a large number of electrical wires 50 are distributed through a particular location, solid or rigid tubes/conduits 27 are employed, such as electrical metal tubing (EMT) or rigid conduits.

In employing the present invention, individual flexible metal conduits and/or armored or metal clad cables 25 and 26 are quickly and easily affixed to dual/duplex conduit/cable connector 20 of the present invention for enabling electrical wires 50 mounted in the individual flexible metal conduits and/or armored or metal clad cables 25 and 26 to be combined and carried through a single, elongated, solid or rigid tube/conduit 27. This desirable result is easily achieved using dual/duplex conduit/cable connector 20 with the final assembly being depicted in FIGS. 6 and 7.

In FIGS. 8-12, an alternate embodiment of dual/duplex conduit/cable connector 20 of the present invention is depicted. In this embodiment, connector 20 is constructed in a manner which is virtually identical to the construction detailed above and shown in FIGS. 1-7. For this reason, FIGS. 8-12 incorporate the same reference numerals wherein the identical structural elements are depicted. Furthermore, the detailed discussion provided above regarding the embodiment of connector 20 shown in FIGS. 1-7 is hereby repeated and incorporated by reference.

As shown in FIGS. 8-12, this alternate embodiment of dual/duplex conduit/cable connector 20 differs only in the construction employed for forming enlarged portal 30 of front end 22 of connector 20. In this embodiment, enlarged portal 30 incorporates divider wall 48 formed therein, effectively forming two separate and independent holdings zones for flexible metal conduits and/or armor or metal clad cables 25 and 26.

As depicted, divider wall 48 is constructed substantially midway in enlarged portal 30 of front end 22 in order to establish two substantially identically dimensioned holding or receiving zones for flexible metal conduits and/or armor or metal clad cables 25 and 26. In this way, once flexible metal conduits and/or armor clad or metal cables 25 and 26 are mounted and securely affixed to connector 20, assurance is provided that each of flexible metal conduit and/or armor or clad cable 25 and 26 are completely independent of each other and are incapable of contacting each other.

In this way, electrical independence of each flexible metal conduit and/or armor or metal clad cable is assured and continuous, trouble-free electrical transmission and operation is provided. Although the previous embodiment detailed above and shown in FIGS. 1-7 effectively provides the desired identical electrical independence of each flexible metal conduit and/or armor or metal clad cable mounted therein, this alternate embodiment with divider wall 48 formed therein provides an enhanced level of assurance that contact between the flexible metal conduits and/or armored or metal clad cables is impossible to occur.

Figure 11:
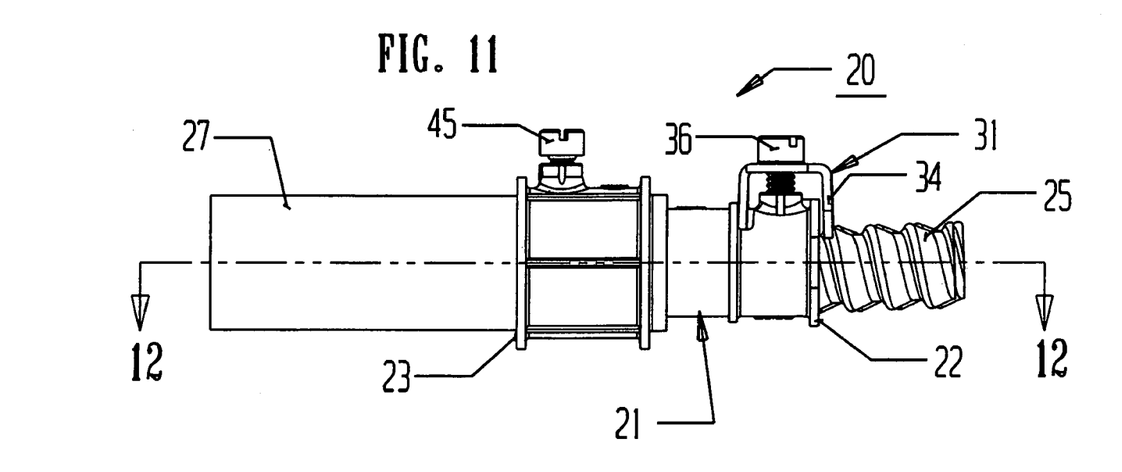
FIG. 11 is a side elevation view of the duplex connector of FIG. 9, shown mounted to a solid or rigid tubing/conduit at one end thereof with two separate and independent flexible metal conduits and/or armor or metal clad cables securely affixed to the opposed end thereof.
Figure 12:
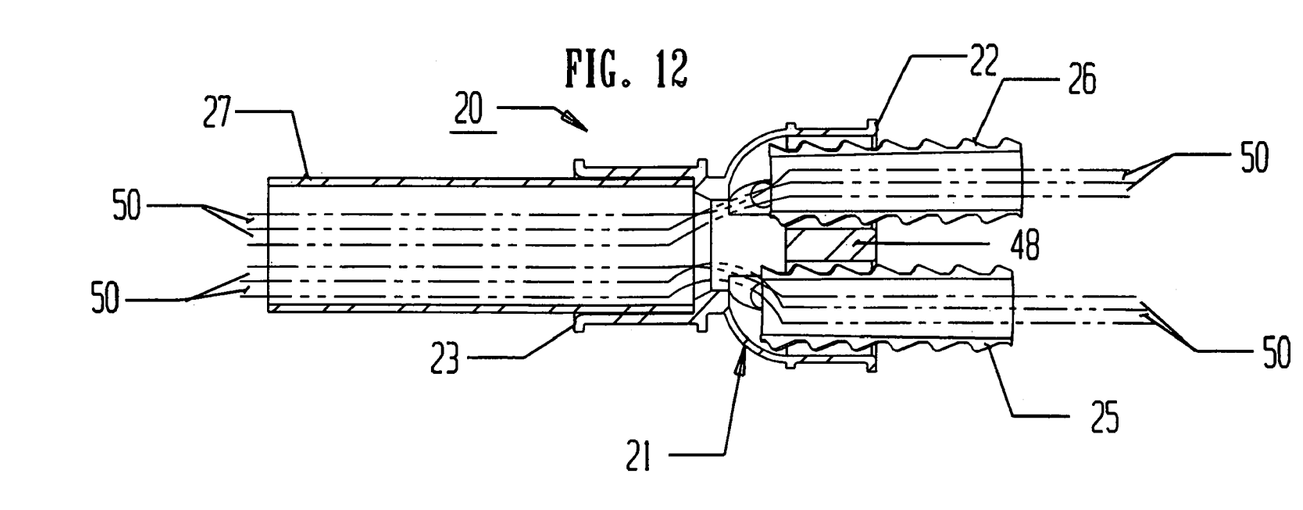
FIG. 12 is a cross-sectional top plan view of the duplex connector of FIG. 11 taken along line 12-12.
Figures 13, 14, 15:
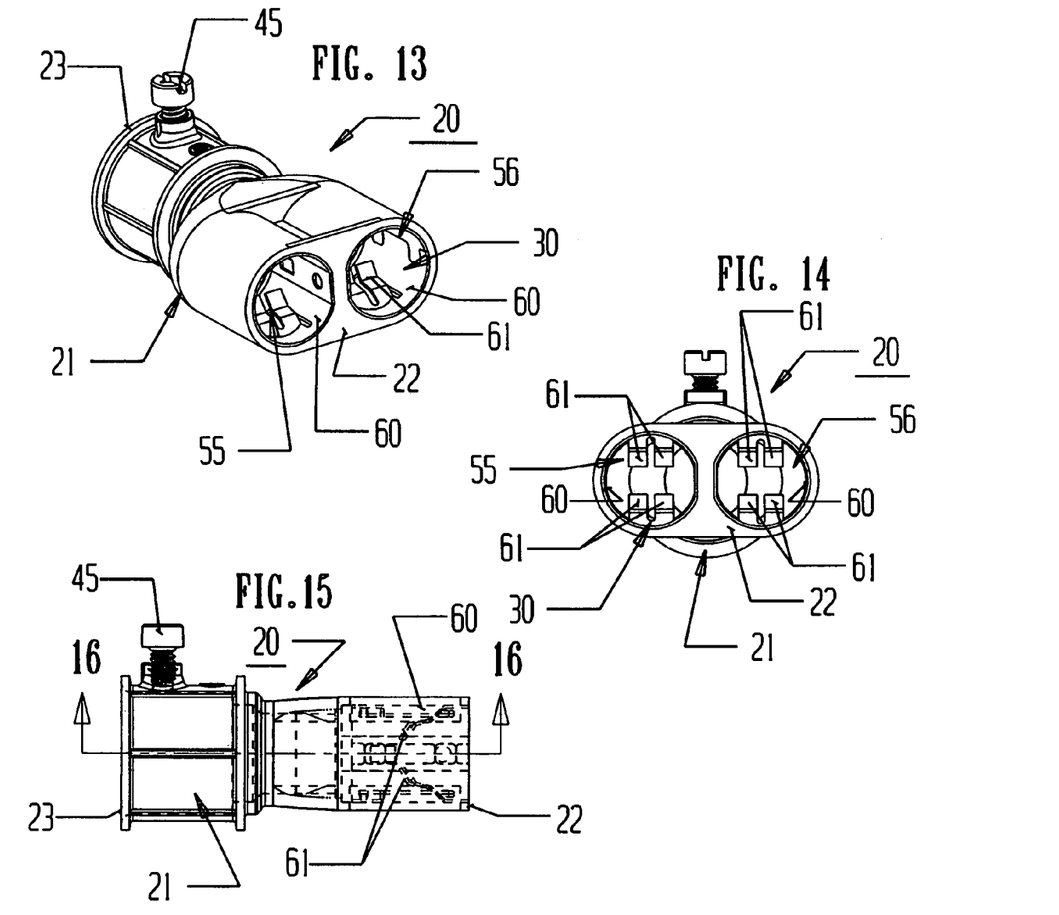
FIG. 13 is a front perspective view of an alternate embodiment of the duplex connector of the present invention.
FIG. 14 is a front elevation view of the duplex connector of FIG. 13.
FIG. 15 is a side elevation view of the duplex connector of FIG. 14.
Figure 16:
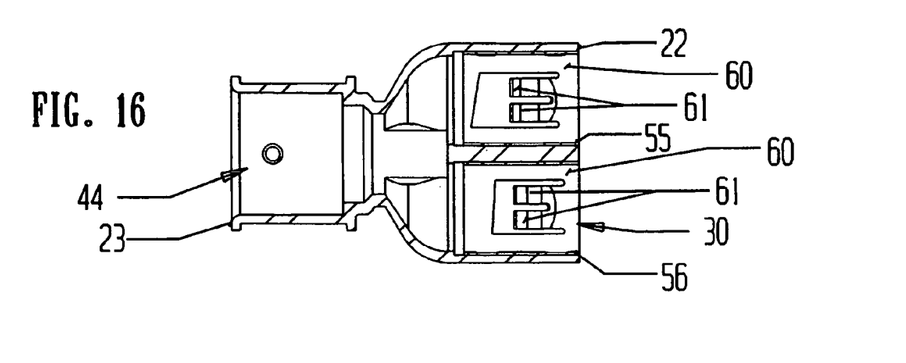
FIG. 16 is a cross-sectional bottom plan view of the duplex connector of FIG. 15 taken along line 16-16.
Figure 17:
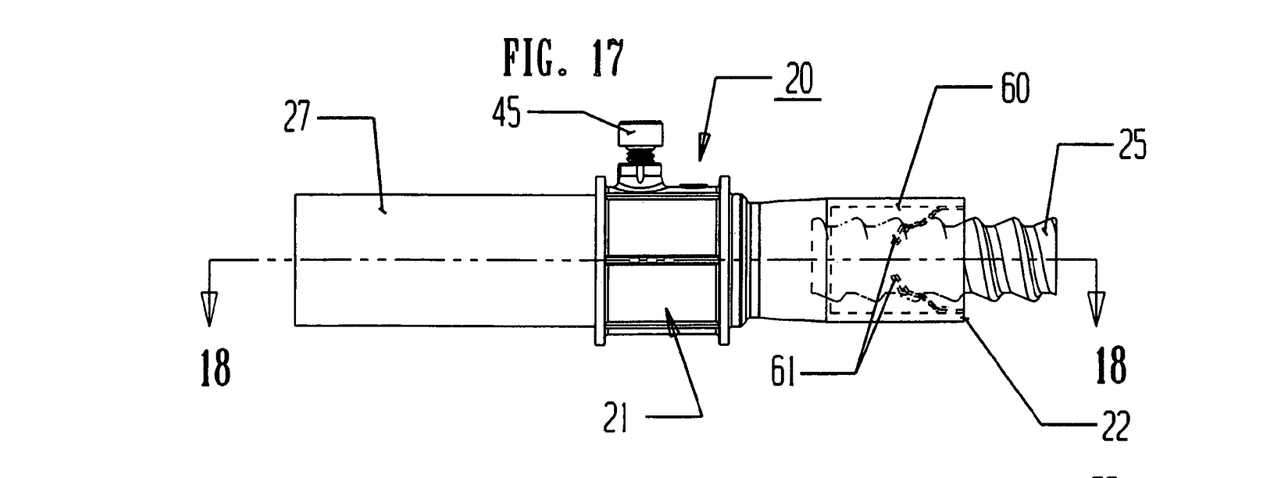
FIG. 17 is a side elevation view of the duplex connector of FIG. 13 shown mounted to a solid or rigid tubing/conduit at one end thereof with two separate and independent flexible metal conduits and/or armored or metal clad cables securely affixed to the opposed end thereof.
Figure 18:
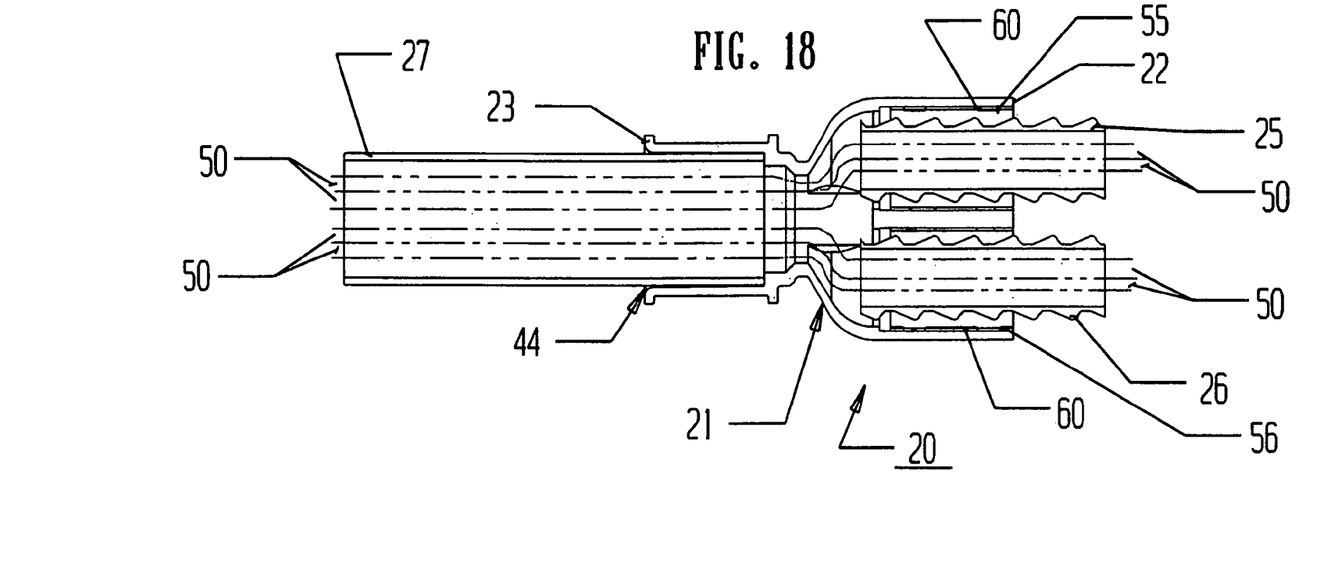
FIG. 18 is a cross-sectional top plan view of the duplex connector of FIG. 17 taken along line 18-18.

As is evident from the depiction provided in FIGS. 11 and 12, by employing this alternate embodiment of the present invention, individual flexible metal conduits and/or armor or metal clad cables 25 and 26 are quickly and easily affixed to dual/duplex conduit/cable connector 20 for enabling electrical wires 50 mounted in the individual flexible metal conduits and/or armored or metal clad cables 25 and 26 to be combined and carried through a single, elongated, solid or rigid tube/conduit 27, with complete assurance that electrical wires 50 of each flexible metal conduit and/or armored or metal clad cable remain completely independent. This desirable result is easily achieved using this embodiment of dual/duplex conduit/cable connector 20.

In FIGS. 13-18, a further alternate embodiment of the present invention is depicted. In this embodiment, dual/duplex conduit/cable connector 20 is depicted having a construction similar to the embodiment of connector 20 detailed above and shown in FIGS. 1-12. However, as detailed below, instead of incorporating holding brackets for securely maintaining flexible metal conduits and/or armored or metal clad cables 25 and 26 in position, this embodiment incorporates locking rings or sleeves 60 constructed for receiving and lockingly retaining the desired flexible metal conduits and/or armored or metal clad cables 25 and 26 in the precisely desired position. As detailed below, regardless of the embodiment employed, the identical goals and objectives of enabling flexible metal conduits and/or armored or metal clad cables 25 and 26 to be quickly and easily secured to connector 20 with the entire assembly being mounted to any desired solid or rigid metal tube/conduit 27 is achieved.

As shown in FIGS. 13-18, in this alternate embodiment, dual/duplex conduit/cable connector 20 comprises body member 21, which incorporates enlarged front end 22, and rear end 23. In addition, enlarged front end 22 incorporates enlarged portal zone 30 formed therein which comprises receiving zones 55 and 56. Furthermore, receiving zones 55 and 56 each incorporate separate, substantially cylindrically shaped locking rings or sleeves 60.

In the preferred construction, each substantially cylindrically shaped locking ring/sleeve 60 incorporates a plurality of finger members 61 radially extending inwardly from the outer surface of locking ring/sleeve 60. By employing this construction, flexible metal conduits and/or armored or metal clad cables 25 and 26 are inserted into receiving zones 55 and 56 of enlarged portal 30 of front end 22, enabling finger members 61 to lockingly contact and engage the outer surface of flexible metal conduits and/or armored or metal clad cables 25 and 26.

In this regard, as flexible metal conduit and/or armored or metal clad cable 25 is telescopically inserted into locking ring/sleeve 60 of receiving zone 55, the outer surface thereof is advanced into contact and engagement with finger members 61 of locking ring/sleeve 60. As flexible metal conduit and/or armor or metal clad cable 25 is telescopically advanced into further engagement with locking ring/sleeve 60, finger members 61 arcuately pivot or flex for enabling flexible metal conduit and/or armored or metal clad cable 25 to move inwardly, while lockingly engaging the outer surface of flexible metal conduit and/or armored or metal clad cable 25 to prevent its removal from receiving zone 55.

In this way, once flexible metal conduit and/or armored or metal clad cable 25 has been telescopically advanced completely into receiving zone 55, cable 25 is securely maintained in locked engagement therein. In addition, electrical wires 50 contained in flexible metal conduit and/or armored or metal clad cable 25 are advanced through connector 20 and solid or rigid metal tubing/conduit 27 secured thereto for enabling wires 50 to be fed and connected to a desired location.

In completing the desired assembly, flexible metal conduit and/or armored or metal clad cable 26 is telescopically inserted into locking ring/sleeve 60 of receiving zone 56 in order to enable the outer surface thereof to be advanced into contact and engagement with finger members 61 of locking ring/sleeve 60. As flexible metal conduit and/or armor or metal clad cable 26 is telescopically advanced into further engagement with locking ring/sleeve 60, finger members 61 arcuately pivot or flex for enabling flexible metal conduit and/or armored metal clad cable 26 to move inwardly, while lockingly engaging the outer surface of flexible metal conduit and/or armored or metal clad cable 26 to prevent its removal from receiving zone 56.

Once flexible metal conduit and/or armored metal clad cable 26 has been telescopically advanced completely into receiving zone 56, cable 26 is securely maintained in locked engagement therein. In addition, electrical wires 50 contained in flexible metal conduit and/or armored or metal clad cable 26 are advanced through connector 20 and solid or rigid metal tubing/conduit 27, for enabling wires 50 to be fed and connected to the desired location. In this way, the desired electrical connection is quickly and easily achieved and the goals of the present invention are realized.

As is evident from the foregoing detailed discussion, each embodiment of dual/duplex conduit/cable connector 20 of the present invention is constructed for enabling flexible metal conduits and/or armored or metal clad cables to be quickly and easily secured to connector 20 with the entire assembly being mounted to any desired solid or rigid tube/conduit. By employing the present invention, this desired mounted interengagement is achieved quickly and easily, in an extremely cost efficient manner. As a result, prior art difficulties and drawbacks are fully overcome and an easily achieved assembly is realized.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An electrical connector comprising:
   A. a unitary, integrally formed body member having a first end and a second end;
   B. the first end of the body member comprising
      a. an enlarged portal for receiving and securely holding two separate and independent flexible metal conduits and/or armored or metal clad cables, and
      b. a wall member formed in the enlarged portal and extending into the first end of the body member for maintaining the two flexible metal conduits and/or armored or metal clad cables separately from each other in side to side adjacent relationship and electrically independent; and
   C. the second end of the body member constructed for being quickly and easily securely mounted to a solid or rigid metal tubing or conduit;
whereby two separate and independent flexible metal conduits and/or armored or metal clad cables are quickly and easily securely combined for mounting with a solid or rigid metal tubing or conduit for enabling the electrical wires contained therein to be fed therethrough.

2. The electrical connector defined in claim 1, wherein said wall member effectively establishes two separate and independent receiving zones in the enlarged portal of the body member for enabling each flexible metal conduit and/or armored or metal clad cable to be received and retained in a separate zone.

3. The electrical connector defined in claim 2, wherein said body member further comprises brackets cooperatively associated with the first end of the body member with said brackets being positioned for secure mounted holding interengagement with the flexible metal conduits and/or armored or metal clad cables in each of said separate receiving zones.

4. The electrical connector defined in claim 3, wherein two brackets are employed, with each of said brackets comprising a generally U-shape formed by a first wall portion, a second wall portion and a central, interconnecting portion extending therebetween, with said central interconnecting portion incorporating a threaded aperture for receiving and retaining a screw member.

5. The electrical connector defined in claim 4, wherein the screw member of each bracket is threadedly engaged with the body member for maintaining the bracket in cooperating relationship with one receiving zone of the portal of the body member, with the first wall portion of each bracket being maintained in juxtaposed spaced relationship to the entry zone of the receiving zone.

6. The electrical connector defined in claim 5, wherein said body member further comprises two slots formed therein in side to side relationship with each other and spaced inwardly from the portal of the first end of the body member, with said slots being constructed for receiving the second wall portion of each bracket for enabling said second wall portion to extend therethrough.

7. The electrical connector defined in claim 6, wherein said brackets are constructed for cooperating association with the flexible metal conduits and/or armored or metal clad cables for being positioned to enable telescopic insertion of the flexible metal conduits and/or armored or metal clad cables into the receiving zones of the portal of the body member while also being clampingly engaged with the outer surface of the flexible metal conduits and/or armored or metal clad cables for assuring secure mounted engagement thereof with the body member.

8. The electrical connector defined in claim 2, wherein the second end of the body member is further defined as being constructed for telescopic insertion into peripheral surrounding mounted engagement with a terminating end of any desired solid or rigid metal tubing or conduit.

9. The electrical connector defined in claim 8, wherein said second end is further defined as comprising clamping means cooperatively associated therewith for securely engaging and affixing the second end of the connector to the desired solid or rigid metal tubing or conduit.

10. The electrical connector defined in claim 9, wherein said clamping means is further defined as comprising a threaded screw mounted to the second end of the connector for being advanced into engagement with the solid or rigid metal tubing or conduit when desired.

11. The electrical connector defined in claim 2, wherein said connector further comprises two substantially cylindrically shaped locking rings or sleeves constructed for enabling the flexible metal conduits and/or armored or metal clad cables to be inserted and lockingly engaged therein.

12. The electrical connector defined in claim 11, wherein one of said locking rings/sleeves is securely mounted in one of said receiving zones, thereby providing rapid, secure, locking engagement of the flexible metal conduits and/or armored or metal clad cables in the enlarged portal of the body member.

13. The electrical connector defined in claim 12, wherein each of said cylindrically shaped locking rings/sleeves comprises a plurality of inwardly extending fingers positioned for engaging the outer surface of the flexible metal conduit and/or armored or metal clad cable and lockingly retaining said cable therein, effectively preventing axial removal of the cable therefrom.

14. The electrical connector defined in claim 12, wherein the second end of the body member is further defined as being constructed for telescopic insertion into peripheral surrounding mounted engagement with a terminating end of any desired solid or rigid metal tubing or conduit.

15. The electrical connector defined in claim 14, wherein said second end is further defined as comprising clamping means cooperatively associated therewith for securely engaging and affixing the second end of the connector to the desired solid or rigid metal tubing or conduit.

16. The electrical connector defined in claim 15, wherein said clamping means is further defined as comprising a threaded screw mounted to the second end of the connector for being advanced into engagement with the solid or rigid metal tubing or conduit when desired.

* * * * *